US009235552B1

(12) United States Patent
Eck et al.

(10) Patent No.: US 9,235,552 B1
(45) Date of Patent: Jan. 12, 2016

(54) COLLABORATIVE AUDIO RECORDING OF AN EVENT BY MULTIPLE MOBILE DEVICES

(71) Applicant: Google Inc., Mountain View, CA (US)

(72) Inventors: Douglas Eck, Palo Alto, CA (US); Jay Yagnik, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 388 days.

(21) Appl. No.: 13/705,951

(22) Filed: Dec. 5, 2012

(51) Int. Cl.
*G06F 17/00* (2006.01)

(52) U.S. Cl.
CPC .......... *G06F 17/00* (2013.01); *G10H 2240/175* (2013.01)

(58) Field of Classification Search
CPC ........... G10H 2240/175; G10H 1/0025; H04L 65/403; H04L 65/4007; H04M 7/0027
See application file for complete search history.

(56) References Cited

U.S. PATENT DOCUMENTS

| 2007/0044639 | A1* | 3/2007 | Farbood et al. | 84/609 |
| 2012/0050570 | A1* | 3/2012 | Jasinski et al. | 348/231.4 |
| 2012/0310396 | A1* | 12/2012 | Ojanpera | 700/94 |
| 2013/0226324 | A1* | 8/2013 | Hannuksela et al. | 700/94 |

OTHER PUBLICATIONS

Rehn et al. "Sound Ranking Using Auditory Sparse-Code Representations," ICML 2009 Workshop on Sparse Method for Music Audio (May 13, 2009), 3 pp., available at http://research.google.com/pubs/pub35269.html.
Proakis et al. "Digital Signal Processing: Principles, Algorithms, and Applications," 4th ed., Prentice Hall, Sections 4.2, 6.5.2, and 14.1; pp. 241-268, 430-433, 961-973 (2007).

* cited by examiner

*Primary Examiner* — Curtis Kuntz
*Assistant Examiner* — Thomas Maung
(74) *Attorney, Agent, or Firm* — Morris & Kamlay LLP (57) ABSTRACT

Techniques are disclosed for producing a collaborative recording of an audio event. An online server or service identifies participating mobile devices with recording capabilities that are available for recording at least a portion of the audio event. The online server or service determines the locations of the potential participating mobile devices, and identifies ranges of frequencies to be recorded by each of the participating mobile devices. The individual recordings are then compiled into a final collaborative recording.

15 Claims, 4 Drawing Sheets

COLLABORATIVE AUDIO RECORDING OF AN EVENT BY MULTIPLE MOBILE DEVICES

BACKGROUND

The conventional way to obtain a high-quality sound recording of a live event is by using expensive and professional audio equipment. Such equipment includes, for example, amplifiers, audio cables and connectors, headphones and headsets, interfaces and routers, microphones, mixers, power conditioning and backup systems, racks and cases, speakers, recorders and players, and signal processing equipment. With some events, a team of audio technicians may be needed to setup, operate, record, and strike the audio recording equipment for the event.

SUMMARY

One embodiment provides a collaborative audio recording system, comprising: a participating-mobile-device identification utility operatively configured to identify participating mobile devices capable of participating in the recording of an audio event; a mobile-device-location determining utility operatively configured to determine the geographical location of the participating mobile devices; a frequency-allocation utility operatively configured to identify ranges of frequencies to be recorded for a recording of the audio event, wherein the ranges of frequencies are within recording capabilities of the participating mobile devices; a recording-instructions disseminator operatively configured to transmit, to each of the participating mobile devices, recording instructions that specify, at least in part, a particular frequency range to be recorded by the participating mobile device; and a recording compiler operatively configured to receive and compile individual recordings of the specified frequency range received from the participating mobile devices.

Another embodiment of the disclosure provides a method of generating a recording of an audio event, the method comprising: identifying one or more participating mobile devices with recording capabilities that are available for recording at least a portion of the audio event; determining locations of the participating mobile devices; identifying a selected portion of the audio event to be recorded by the participating mobile devices in accordance with recording capabilities of the participating mobile devices; sending recording instructions to each of the participating mobile devices; receiving individual recordings from the participating mobile devices; compiling the individual recordings into a single collaborative recording; and providing access to the collaborative recording.

DETAILED DESCRIPTION OF EXAMPLES

Some embodiments provide for making a collaborative recording of an audio event using multiple mobile devices. According to some embodiments, an online system or service, such as a social networking web service, identifies and locates mobile devices in the area of the audio event and operated by users willing to participate in the collaborative recording. The system identifies frequency ranges for each of the participating mobile devices to record. The system sends recording instructions to each of the mobile devices, the recording instructions specifying the frequency range to record and the time interval within which to do the recording. The individual recordings are then received by the system, compiled, and processed into a final, collaborative recording.

When attending a live event (e.g., a concert), a person sometimes records the event using their mobile phone for their personal enjoyment later. Unfortunately, the audio quality of a sound recording made by their phone is typically of poor quality because of a number of factors. Examples of such factors include a poor location (e.g., too close to speakers and the resulting distortion), nearby undesired sounds (e.g., conversations, baby crying, and machinery or mechanical sounds (e.g., air conditioner, doors slamming, glasses clinking).

The techniques described herein make it possible, practical, and effective to produce a high-quality sound recording of a live event that has multiple attendees with their mobile phones. The described techniques for collaborative audio recording of an event take advantage of the microphones in the mobile devices of the attendees (e.g., mobile phones) at the event.

With the techniques described herein, the multiple phones present at a common live event (e.g., a music concert) pool their audio recording capabilities to produce a high-quality audio recording of that event. The pooling may be accomplished via a resource (e.g., a web service) available via a network (e.g., the Internet) with which the mobile devices operatively connect.

EXAMPLE SCENARIO

Figure 1:
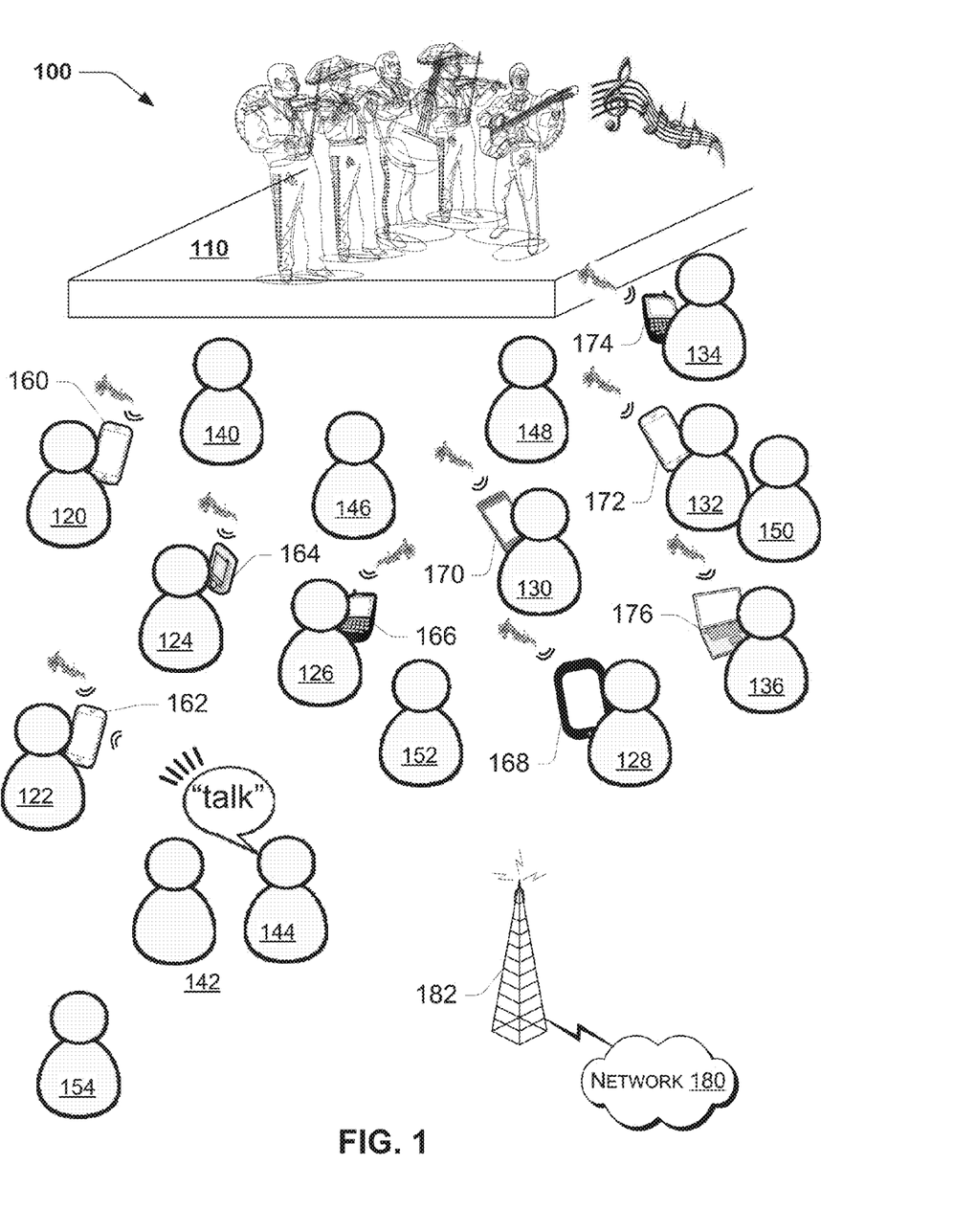
FIG. 1 is a schematic diagram illustrating a scenario where techniques are implemented for collaborative recording of an audio event, according to one aspect of the disclosure.

FIG. 1 illustrates an example scenario 100 where the collaborative-recording techniques described herein may be employed. The scenario 100 includes a live event 110 that is attended by multiple people. As depicted, the live event 110 may be a music concert, such as, for example, a mariachi band performing familiar music. In some embodiments, the live event 110 may be any well-attended performance, entertainment, speech, debate, presentation, seminar, gala, celebration, play, exhibition, pageant, and/or ceremony, among others, where sound is something that someone might like to record, transmit, and/or broadcast. Another example of such a live event is a telephone conference.

As depicted in FIG. 1, several people (i.e., people 120-154) are attending the event 110. Some of those in the audience brought along their mobile devices that have sound recording capabilities, namely, a microphone. The mobile devices depicted include smartphones 160, 162, 166, 170, 172, 174, a personal digital assistant (PDA) 164, a tablet computer 168, and laptop computer 176. In other embodiments, other mobile devices with audio recording capability may be used.

These mobile devices (i.e., mobile devices 160-176) are capable of operatively connecting with a network 180. This connection may be accomplished via a mobile telecommunications wireless system (as represented by cellular tower 182). Alternatively, the connection may be accomplished via other suitable approaches (for example, as wireless local area network (WLAN), Bluetooth™, and wired connections, among others). The mobile devices 160-176 may communicate with the network 180 during the event 110 or at some later time when such communications are possible or better. For implementations where the mobile devices 160-176 communicate with the network 180 after an event 110 has been recorded, the mobile devices 160-176 may store data from the recording until communication over the network 180 is possible, or more effective and efficient. The network 180 may include or be connected to various facilities, such as the so-called "Cloud," the Internet, and/or one or more centralized servers.

The mobile-device equipped attendees (e.g., people 120-136) may choose to participate in a collaborative audio recording at the event 110. The attendees may, for example, use a so-called application (or "app") on a smartphone (for instance) to participate in the collaborative recording after having been invited to join, or perhaps as a result of having sought out an opportunity to contribute to a recording of an event learned from others. In addition, the attendees may join in the collaborative audio recording of the event by using a social networking web service.

The collaboration audio-recording app, social networking web service, or other online tool works in cooperation with a collaboration audio-recording service. The collaboration audio-recording service is available to users via the network 180 and it will be discussed in more detail later herein.

Using the collaboration audio-recording app or the social networking site, an attendee may indicate their current or future attendance to the event 110. The attendee may have learned of the event 110 through the social networking site, and also perhaps of the ability to take part in the collaborative recording of the event 110 by accessing the audio-recording app. The social networking site may also provide any downloadable apps that may be required on the prospective attendee's mobile device in order to take part in the collaborative recording.

Alternatively, a user may consent to sharing their current or future location with the collaboration audio-recording service. If the user chooses to share their location, their current location may be determined via any existing or future location-detection techniques and technologies. Examples of known location-detection techniques and technologies include global positioning system (GPS), wireless positioning system (WPS), local positioning system (LPS), mobile phone location-based services (e.g., via multi-lateration of signals between several towers of a mobile-device communication network), geolocation, etc.

Based upon the given or determined location of the user and the known location of the event 110, the collaboration audio-recording system or service may infer that the user is attending the event 110. In other embodiments, the user may be asked to confirm their attendance at the event 110.

Once the user's attendance at the event 110 is established, the user may be asked if the user would like to participate in a collaborative audio recording. For example, the social networking web service may offer this option to attendee 122 of the event 110. If attendee 122 chooses to participate, then the collaboration audio-recording system or service may include the recording of the attendee's mobile device 162 as part of the collaborative recording. The social networking web service, or other online service, can inform potential participating users that the option of participating in a collaborative recording of an audio event is available. If a user indicates an interest in participating in the collaborative recording, or even just in eventually purchasing the end result of the recording, information regarding how to participate, any downloadable apps that may be necessary for the user to participate, etc., can be sent to the user.

The collaboration audio-recording system or service identifies the queue of participating users at the event and manages the overall collaboration recording. The service may also inform potentially interested users of any new or future opportunities to participate in a collaborative recording of an event. Additional functions that may be performed by the collaboration audio-recording system or service could include contacting any content-rights owners for the event, such as performing musicians, songwriters, publishers, lecturers, public speakers, copyright owners, universities, etc., and obtaining permission to coordinate and obtain the recordings of the event, as well as offering one or more forms of remuneration for the necessary rights, and for the finished and compiled recordings themselves. The collaboration audio-recording system may also include functionality that contacts rights-holders before or after the recording of an audio event, and that obtains the necessary permissions to commercialize the recordings after they have been made.

The collaboration audio-recording system or service may include a band-pass filter bank, depending on the number of participants. For large groups, a large band-pass bank could be used. For smaller groups, a smaller band-pass bank may be employed. A band-pass filter is a device that passes frequencies within a certain range and rejects (e.g., attenuates) frequencies outside that range. The range of accepted frequencies is often referred to as the band, or passband. A filter bank is an array of band-pass filters that separates the input signal into multiple components. Each component carries a single frequency sub-band of the original signal.

In one implementation, each participating user may be assigned automatically and randomly a particular band, or range of frequencies of the audio signals, to record. In alternative implementations each participating user may be assigned a particular time span to record. The assigned portions of the audio event to be recorded by each participating user are called audio snippets herein. Further alternative implementations may include assignment of these audio snippets in a predefined pattern, or in accordance with procedures that take into consideration other specific criteria and factors. This focuses a phone's limited recording and storage capacity on a part of the overall composition. Limiting the band of recording reduces the load on resources (e.g., battery life, memory usage, storage space, etc.) on a particular mobile device. In some embodiments, assigning snippets to the different mobile devices randomly may help increase the likelihood of an even distribution of locations about the event thereby reducing the impact of any recording issues associated with a particular location. In one embodiment, each client device (e.g., phone) allows full control over the frequency spectrum to record. In another embodiment, the client devices allow no control over the frequency spectrum to record. In yet another embodiment, one or more client devices allow full control over the frequency spectrum to record, one or more client devices allow no control over the frequency spectrum to record, and/or one or more client devices some control over the frequency spectrum to record.

In alternative implementations, the range of frequencies of audio signals and/or time spans of the signals assigned to each participating user could be determined and implemented based on the location of the user relative to the performance or other source of audio being recorded. The locations of each participating user could be determined from information the user consents to share, or using other location techniques such as those discussed above.

In some embodiments, the assigned frequencies and/or time spans recorded by each mobile device at each location could also be varied or modified depending on the anticipated or actual quality of the recording received when the recording results are transmitted in real time to a receiving server, or after having been stored temporarily on the mobile device before being sent to the receiving server. For example, it may be determined that there is too much distortion at the lower frequencies coming from locations near the subwoofers at a concert. In this case, a frequency-allocation utility of the collaboration audio-recording service may identify ranges or bands of higher frequencies less likely to experience distortion near powerful speakers, in accordance with the recording capabilities of a mobile device.

A recording-instructions disseminator of the collaboration audio-recording service may then send instructions to mobile devices located closest to the stage at a concert, instructing those mobile devices to record only in an identified higher frequency range that would experience less distortion. Other adaptations to the instructions sent to the mobile devices could also be made depending on parameters including, but not limited to, atmospheric conditions, limitations of a particular microphone in a particular mobile device, frequencies of undesirable noises in proximity to the recording mobile device, etc.

Based on the size of the participating user network, a phone randomly records the output of its assigned band-pass filter for a specified amount of time and transmits the results to the central server. Peer-to-peer (P2P) computer networks could be used to optimize the transmission to the central server. Peer-to-peer refers to a computer network in which each computer in the network can act as a client or a server for other computers in the network. This type of an arrangement allows for shared access to files and peripherals without the need for a central server. P2P is a distributed application architecture that partitions tasks or workloads amongst peers, where peers are equally privileged participants in the application. For large events, a single phone would only need to record every once in a while.

The participating mobile devices upload their audio snippets. Upload the audio snippets may be done in streaming manner (i.e., as the snippet is being recorded or perhaps with a short delay) during the event if a connection with the network 180 is available. Otherwise, the mobile devices may upload their stored snippets, or band-pass filtered recordings, at a later time once communication becomes available or there is improved/sufficient bandwidth.

At the central server, a de-noised version of the recording is reconstructed or compiled by phase-aligning and/or time-aligning the individual band-pass filtered recordings and averaging them. If a sufficient number of participating users are recording, any local information (e.g., a nearby conversation (such as between person 142 and 144 in FIG. 1), someone coughing, etc.) would be filtered out by the averaging. Essentially, averaging/filtering can act as a consensus mechanism to filter out noise in each recording channel.

In one embodiment, snippets are combined using timestamps. In another embodiment, for example, if time stamps are not reliable enough, the snippets can be combined using temporal correlation that can be computed in the time-domain or spectral-domain. In this case, points of alignment would have the highest temporal cross-correlation. In further embodiments, more specialized solutions are possible. For example, phones could communicate with each other via sounds outside the human hearing range (or using other signals) in order to propagate precise time and phase information. Also, in cases where a single source is most prominent (for example, the main stage of a concert), some embodiments could more precisely calculate delay if some sort of sound (for example, above the range of human hearing) were periodically emitted from a fixed, known location.

Global noises such as a plane flying overhead at an outdoor event would contaminate many or all recordings and would show up in the average. However, given that so many source microphones are available, any commonly available source separation approaches will work to eliminate much or all of any point-source noise. This could be achieved in the signal reconstruction process by allowing the user to identify where in the recording a noise is present and then allowing the user to choose from among candidate sources provided to the user by the source separation algorithm. That source can then be removed from the reconstructed recording.

Various methods for reducing noise and improving the recording can also be employed, including techniques that implement a time-frequency conversion such as Fourier transform. The individual signals for predetermined audio snippets or frequency bands received from the mobile devices could be converted into signals on a time axis. These signals on the time axis could then be converted into signals on a frequency axis using techniques such as Fourier transform. A digital signal processor could then calculate an amplitude component for each of the predetermined frequency bands received from the mobile devices along the frequency axis. A noise reduction coefficient could be calculated on the basis of the calculated amplitude components, and applied to modify the signals to reduce any noise.

After the event is over, and a reconstructed collaborative recording is made, participating users may be given the opportunity to listen to and enjoy the final recording. This may be done via a website, social networking site, email, etc. In addition, these users and perhaps other attendees may be given an opportunity to purchase a copy of the final recording for later enjoyment. Perhaps, even other people might make such a purchase.

In other embodiments, the rights of the content (for example, owned by the performers, publishers, songwriters, etc.) would be respected. If such rights exist, the right holders will be given the opportunity to determine how their content is handled and monetized. They may have an opportunity to receive remuneration for a recording of their content that otherwise might have been lost.

EXAMPLE SYSTEM

Figure 2:
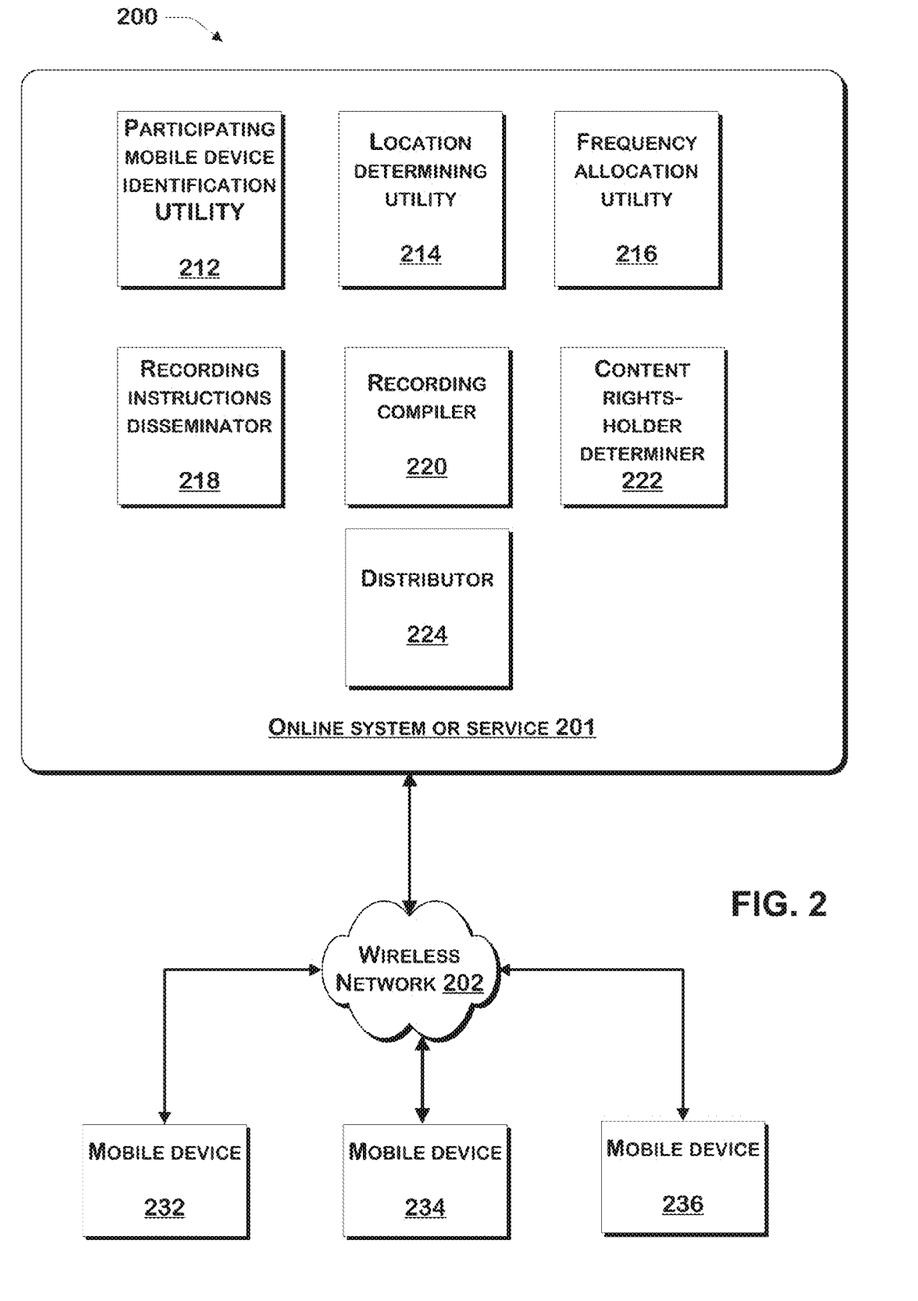
FIG. 2 is a block diagram illustrating an example system operative to implement techniques for collaborative recording of an audio event, according to one aspect of the disclosure.

FIG. 2 is a block diagram illustrating an example system 200 operative to implement techniques for collaborative recording of an audio event, according to one aspect of the disclosure. As shown, the system 200 includes an online system or service 201 and mobile devices 232, 234, 236 communicatively coupled over a wireless network 202 to the online system or service 201. The online system or service 201 includes a participating-mobile-device identification utility 212, a location determining utility 214, a frequency-allocation utility 216, a recording-instructions disseminator 218, a recording compiler 220, a content rights-holder determiner 222, and a distributor 224. While FIG. 2 illustrates these various components as part of the online system or service 201, these components could be contained on one or more servers, or even in some instances at least a portion of the components may be contained on one or more client devices (for example, mobile phones 232, 234, 236).

The participating-mobile-device identification utility 212 of the online system or service 201 is operatively configured to identify the mobile devices that are available and operable by users who are willing and able to record a particular audio event. These participating mobile devices may have "checked in" with the online service 201 to express an interest in taking part in the collaborative recording, or may have received requests to participate as a result of having previously taken part in similar recordings, or as a result of preferences or other attributes entered by the user of each mobile device.

Once the mobile device identification utility 212 has identified participating mobile devices, location determining utility 214 can utilize any of the several methods discussed above for determining the location of each participating mobile device. Knowing the location of each participating mobile device enables the online system or service 201 to determine whether a particular device is positioned properly for recording at least a portion of the audio event of interest.

A frequency-allocation utility 216 of the online system or service 201 may identify ranges or bands of frequencies to be recorded at the audio event of interest in order to produce a high quality audio recording. The frequency-allocation utility 216 can then take into consideration the audio recording capabilities of any particular mobile device that is available to participate in the collaborative recording. The frequency-allocation utility may then allocate particular bands of frequencies and times for recording those bands based on factors including, but not limited to the position of the device relative to the event, ambient or atmospheric conditions at the device, preferences of the user, etc.

A recording-instructions disseminator 218 may then send instructions to each participating mobile device, specifying the particular band of frequencies, and the time interval during which that device should operate to record its allotted portion of the audio event.

When the participating mobile devices 232, 234, 236 have recorded their respective portions of the audio event, and the online service has received at least one recording, a recording compiler 220 of the online service is operatively configured to gather and combine the recordings into a collaborative recording of the audio event of interest. The online service may also include, as part of the compiler, or as an additional utility, signal processing functionality that enables the reduction in any noise, either locally originated near a particular mobile device, or globally originated and affecting all of the recordings. The collaborative audio-recording system 200 would also include a distributor 224 operatively configured to send the compiled recording to the users, online stores, or other purchasers interested in obtaining the recording.

A content rights-holder determiner 222 can also be provided as part of the online system or service 201 in order to ensure that any and all potential content rights-holders are contacted for permission, and properly compensated for the recordings. The content rights-holder determiner 222 may offer content rights-holders a certain percentage of any proceeds obtained from the sale of the recordings. Costs for producing a high quality recording may be considerably reduced as a result of using volunteer attendees at an event to record portions of the event, and then compiling and processing those recordings. In some cases, content rights-holders may therefore receive more compensation for an event than they otherwise would have. In other cases, the content rights-holders may receive the same or less compensation for an event than they otherwise would have.

EXAMPLE PROCESSES

Figure 3:
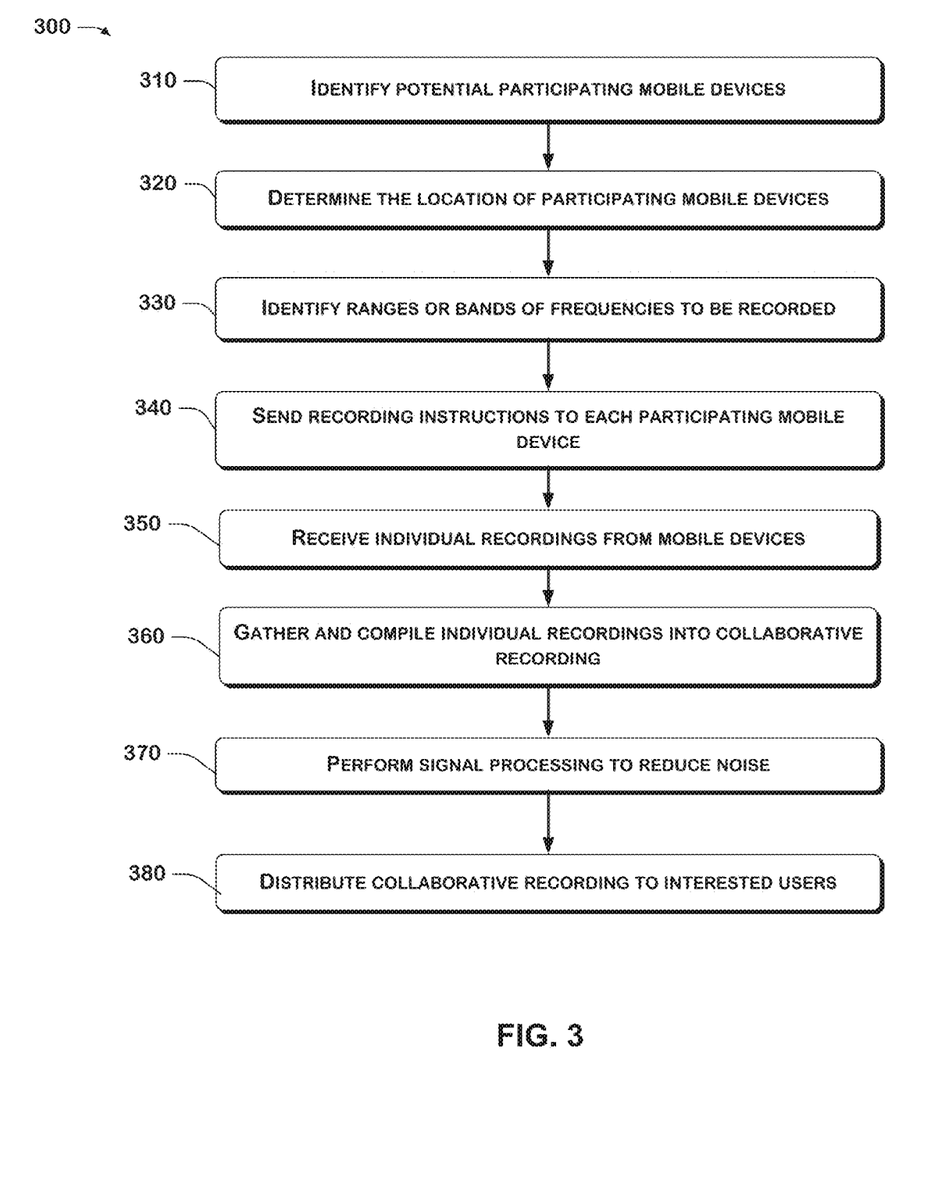
FIG. 3 is a flow chart illustrating an example method for collaborative recording of an audio event, according to one aspect of the disclosure.

FIG. 3 is a flow diagram illustrating an example process 300 that implements the techniques described herein for a collaborative audio-recording, according to one aspect of the disclosure.

The process 300 is performed, at least in part, by a system such as the online system or server 201 illustrated in FIG. 2.

As shown in FIG. 3, the process 300 begins with operation 310, where the server identifies potential participating mobile devices. This identification may be effected by a search of a pre-recorded database for records of all pre-registered client devices that may have previously expressed an interest in participating in collaborative recordings. Alternatively, the online service, or social networking site may send out a notification to all members, linked friends, business associates, etc., that an opportunity to take part in a collaborative recording of an audio event will be available.

At 320, the server determines the location of the participating mobile devices. As mentioned above, this can be achieved through any of a number of different location-detection procedures or protocols.

At 330, the server identifies the range or bands of frequencies to be recorded in order to produce a high quality audio recording. An overall range of frequencies could include 20 Hertz (Hz) (or cycles per second) to 20,000 Hz, or any other range depending on capabilities of the mobile recording devices, the range of human hearing, etc.

At 340, the server sends specific recording instructions to each of the participating mobile devices. The instructions may include the band of frequencies to be recorded, the particular time interval when the recording should occur, whether the device should store the recording to be transmitted at a later time, or should transmit the recording in real time, etc.

At 350, the server receives the individual recordings from the participating mobile devices. These individual recordings may have been sent to one or more central servers of the online service over a wireless or wired network, as discussed above.

At 360, the server gathers and compiles the individual recordings into a collaborative recording. According to various embodiments, the signals from the individual recordings may be phase-aligned and/or time-aligned and averaged if desired in order to filter out undesirable noise and improve the quality of the recording. In some embodiments, once the individual recordings are aligned, the process of getting a denoised version could include "sample averaging" (i.e., averaging the aligned signals) and/or using other estimators such as "median filtering" (i.e., median of aligned signals instead of mean), and/or solving an optimization problem that balances similarity of the synthesized signal with the participating signals and the temporal continuity of the synthesized signal. In some cases, where the server has the option of selecting which frequency band-pass each participating device will record on, the denoising process is done with the awareness of the frequency bands present in each participating signal.

In certain physical settings, the individual recordings may be used to provide spatial cues (e.g., surround sound/immersive audio experience) rather than for a high-quality stereo mix. For example, a single "master" two-channel recording could be made at a known fixed point. The quality of that recording could be improved by the many individual recordings. In addition, the additional phone recordings could provide the necessary information to enable interesting spatialization applications. For example, the systems and methods described herein can be used to create a virtual three-dimensional environment based on multi-phone recording of a large concert and hear the music, mixed with local environmental sounds such that you get the necessary spatial audio cues to feel "like you're there."

At 370, the server performs additional signal processing in order to further enhance the compiled audio recording.

At 380, the server distributes the collaborative and compiled audio-recording to users, content rights-holders, etc. If desired, the finished recording could be sold, or shared with interested users, provided to the content rights-holders, offered as incentive to encourage further participation by additional users who are members of the social networking site, etc.

EXAMPLE COMPUTING SYSTEM

Figure 4:
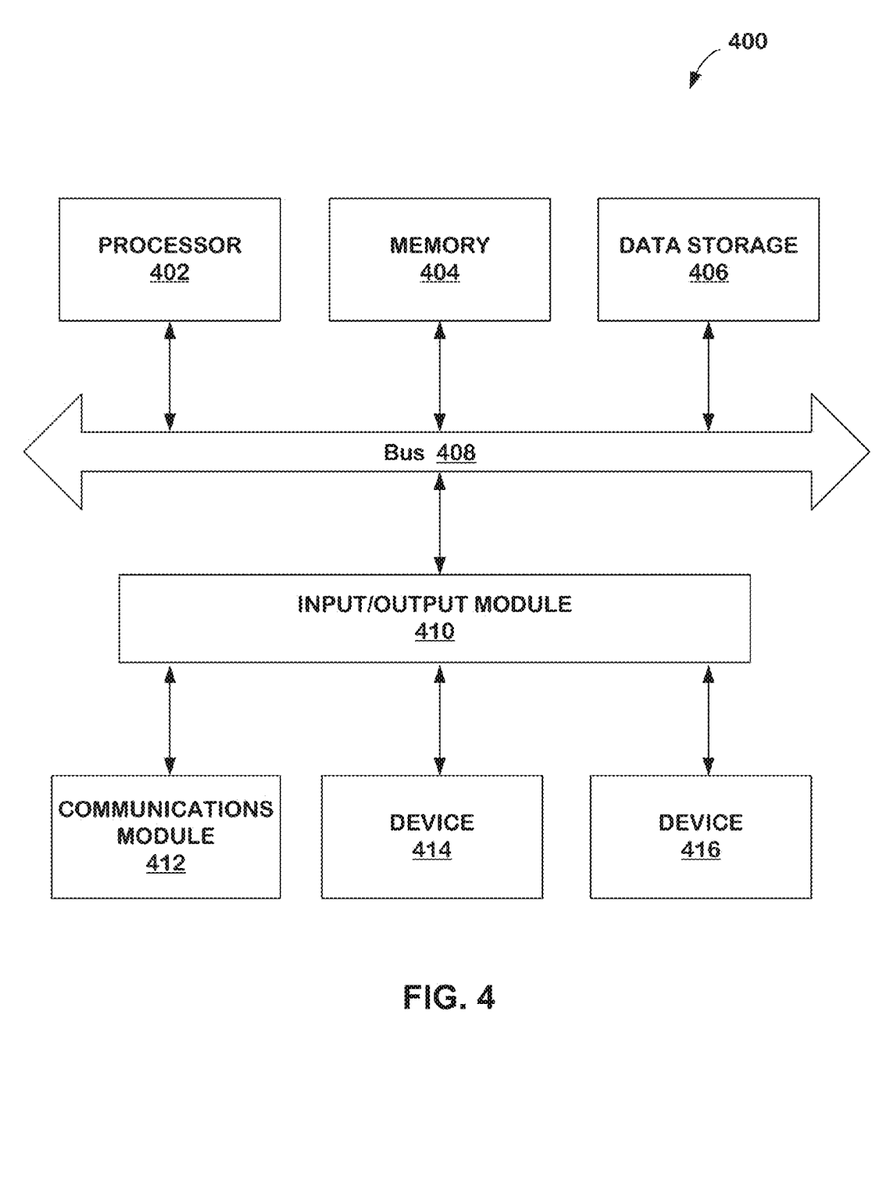
FIG. 4 is a schematic diagram of a computer system employed in accordance with one or more aspects of the disclosure.

FIG. 4 illustrates an example suitable computing system 400 that may be employed in or with one or more aspects of the disclosure described herein.

Implementations of the present disclosure can be carried out on a machine, a system or apparatus as part of or in relation to the machine, or a computer program product embodied in a computer-readable medium executing on one or more of the machines. The one or more processors may be part of a server, client, network infrastructure, mobile computing platform, stationary computing platform, or other computing platform. Therefore, one or more of the above-described utilities, modules, or other functionalities may be embodied on a third-party server, one or more servers of the online system, or some combination thereof.

FIG. 4 is a block diagram illustrating an example computer system 400 with which an online system or service 201 of FIG. 2 can be implemented. In certain aspects, the computer system 400 may be implemented using hardware or a combination of software and hardware, either in a dedicated server, or integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402. These processors may be part of any of the various components shown in FIG. 2.

The processor 402 may be any kind of computational or processing device capable of executing program instructions, codes, binary instructions and the like. The processor 402 may include memory that stores methods, codes, instructions and programs as described herein and elsewhere. The processor 402 may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

A software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of the program across the network. The networking of some or all of these devices may facilitate parallel processing of a program or method at one or more location without deviating from the scope of the disclosed subject matter. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, EVDO, mesh, or other networks types.

The methods, programs codes, and instructions described herein and elsewhere may be implemented on or through mobile devices. The mobile devices may include any device with audio recording capabilities and network connection capabilities, such as cell phones, mobile phones, mobile personal digital assistants, laptops, palmtops, netbooks, pagers, and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Examples of machines on which the elements described herein may be implemented may include, but may not be limited to, personal digital assistants, laptops, personal computers, mobile phones, other handheld computing devices, wired or wireless communication devices, transducers, chips, calculators, satellites, tablet PCs, electronic books, electronic devices, devices having artificial intelligence, computing devices, networking equipment, servers, routers and the like. Furthermore, the elements depicted in the flow chart and block diagrams or any other logical component may be implemented on a machine capable of executing program instructions.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a CRT (cathode ray tube) or LCD (liquid crystal display) monitor, for displaying information to the user.

According to one aspect of the present disclosure, the online collaborative recording system 200, as shown in FIG. 2, can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single embodiment or implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

The invention claimed is:

1. A collaborative audio recording system, comprising:
a participating-mobile-device identification utility operatively configured to identify two or more participating mobile devices capable of participating in the recording of an audio event;
a mobile-device-location determining utility operatively configured to determine the geographical location of the two or more participating mobile devices;
a frequency-allocation utility operatively configured to identify ranges of frequencies to be recorded for a recording of the audio event, wherein the ranges of frequencies are within recording capabilities of the two or more participating mobile devices;
a recording-instructions disseminator operatively configured to transmit, to each of the two or more participating mobile devices, recording instructions that specify, at least in part, a particular frequency range to be recorded by the participating mobile device, wherein the particular frequency range comprises a subband of frequencies from a range of frequencies of sounds to be recorded from the audio event by the participating mobile device, and wherein transmitting the recording instructions to each of the two or more participating mobile devices comprises specifying, for each of the two or more participating mobile devices, a time interval during which a particular range of frequencies is to be recorded by the participating mobile device; and
a recording compiler operatively configured to receive and compile individual recordings of the specified frequency range received from the participating mobile devices.

2. The collaborative audio recording system of claim 1, further comprising:
a distributor operatively configured to provide access to the recorded audio event to one or more users.

3. The collaborative audio recording system of claim 1, further comprising:
a content rights-holder determiner operatively configured to determine one or more content rights-holders for an audio event recorded by the collaborative audio recording system.

4. The collaborative audio recording system of claim 3, wherein the content rights-holder determiner is further operatively configured to offer a share of any proceeds from the recording of the audio event to the one or more content rights-holders.

5. The collaborative audio recording system of claim 1, wherein the recording-instructions disseminator is further operatively configured to analyze a recorded signal received from a first participating mobile device and modify recording instructions for the first participating mobile device based on the recorded signal received from the first participating mobile device.

6. The collaborative audio recording system of claim 5, wherein the recording-instructions disseminator modifies the recording instructions for the first participating mobile device to instruct the first participating mobile device to record a different range of frequencies when a currently recorded range of frequencies includes distortions.

7. The collaborative audio recording system of claim 1, wherein the participating-mobile-device identification mechanism identifies participating mobile devices using a social networking site.

8. The collaborative audio recording system of claim 1, wherein the recording-instructions disseminator randomly selects ranges of frequencies to be recorded by each participating mobile device.

9. The collaborative audio recording system of claim 1, wherein the recording-instructions disseminator selects ranges of frequencies to be recorded and the time intervals for the recordings by each participating mobile device based on, at least in part, the position of each participating mobile device relative to the audio event being recorded.

10. A method of generating a recording of an audio event, the method comprising:
   identifying two or more participating mobile devices with recording capabilities that are available for recording at least a portion of the audio event;
   determining locations of the two or more participating mobile devices;
   identifying, for each of the two or more participating mobile devices, a selected portion of the audio event to be recorded by the participating mobile device in accordance with recording capabilities of the participating mobile device, wherein the selected portion of the audio event comprises a subband of frequencies from a range of frequencies of sounds to be recorded from the audio event by the participating mobile device, and the subband of frequencies occurs during an interval of time included within the audio event;
   sending recording instructions to each of the two or more participating mobile devices, wherein sending the recording instructions to each of the two or more participating mobile devices comprises specifying, for each of the two or more participating mobile devices, a time interval during which a particular range of frequencies is to be recorded by the participating mobile device;
   receiving individual recordings from the two or more participating mobile devices;
   compiling the individual recordings into a single collaborative recording; and
   providing access to the collaborative recording.

11. The method according to claim 10, wherein determining the locations of the two or more participating mobile devices includes, at least in part, using information from a social networking web service.

12. The method according to claim 10, wherein sending the recording instructions to each of the two or more participating mobile devices comprises specifying the range of frequencies of sounds to be recorded by each of the two or more participating mobile devices.

13. The method according to claim 10, wherein compiling the individual recordings comprises one or more of phase-aligning or time-aligning the individual recordings and averaging the results.

14. The method according to claim 10, further comprising:
   identifying and contacting one or more content rights-holders to obtain permissions for the individual recordings and to offer appropriate remuneration in return for the permissions.

15. One or more non-transitory computer-readable storage media storing processor-executable instructions that, when executed, cause one or more processors to perform operations that enable collaborative recording of an audio event using mobile devices, the operations comprising:
   identifying two or more participating mobile devices with recording capabilities that are available for recording at least a portion of the audio event;
   determining locations of the two or more participating mobile devices;
   identifying, for each of the two or more participating mobile devices, a selected portion of the audio event to be recorded by the participating mobile device in accordance with recording capabilities of the participating mobile device, wherein the selected portion of the audio event comprises a subband of frequencies from a range of frequencies of sounds to be recorded from the audio event by the participating mobile device, and the subband of frequencies occurs during an interval of time included within the audio event;
   sending recording instructions to each of the two or more participating mobile devices, wherein sending the recording instructions to each of the two or more participating mobile devices comprises specifying, for each of the two or more participating mobile devices, a time interval during which a particular range of frequencies is to be recorded by the participating mobile device;
   receiving individual recordings from the two or more participating mobile devices;
   compiling the individual recordings into a single collaborative recording; and
   providing access to the collaborative recording.

* * * * *